(No Model.)

J. P. COSTIGAN.
PIPE JOINT.

No. 426,924. Patented Apr. 29, 1890.

Witnesses.

Inventor.
Joseph P. Costigan.

By _____ Attorney.

UNITED STATES PATENT OFFICE.

JOSEPH PATRICK COSTIGAN, OF ST. PAUL, MINNESOTA, ASSIGNOR OF ONE-THIRD TO JOSEPH C. HENRY.

PIPE-JOINT.

SPECIFICATION forming part of Letters Patent No. 426,924, dated April 29, 1890.

Application filed April 3, 1889. Serial No. 305,902. (No model.)

*To all whom it may concern:*

Be it known that I, JOSEPH PATRICK COSTIGAN, a citizen of the United States, residing at St. Paul, in the county of Ramsey and State of Minnesota, have invented certain new and useful Improvements in Pipe-Joints; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to joints for pipes, and is especially applicable to such pipes as are used for the conveyance of waste water or gas and the like, in which the adjacent pipe-sections are united by means of a bell-and-male connection.

The invention consists in the improved form of the adjacent ends of the sections, whereby they may be placed in position and retained relatively to each other without the assistance of packing or calking, whereby the apertures in any two adjacent sections are always concentric without the necessity of special adjustment for that purpose, whereby the strain of retaining the parts in relative longitudinal position shall come upon the pipe-sections directly, and not upon the packing, whereby either section may be turned freely with reference to the other section before calking without risk of uncoupling, and whereby the packing not only locks the sections, but also locks itself, thus making a perfectly tight joint and wholly preventing the separation of the sections by any accidental strain, thus making the joint of as great strength as any part of the pipe, and in details of construction hereinafter more fully set forth.

The invention is illustrated in the accompanying drawings, in which—

Figure 1:
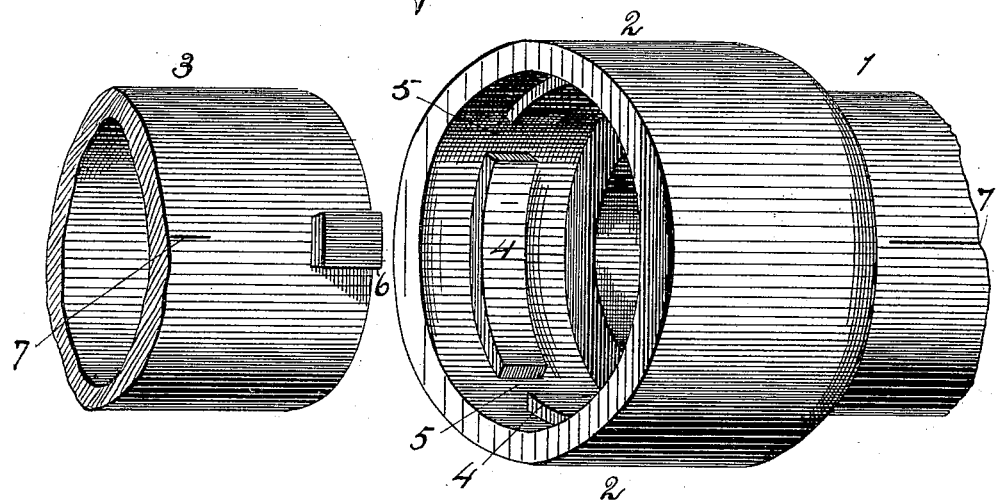
Figure 2:
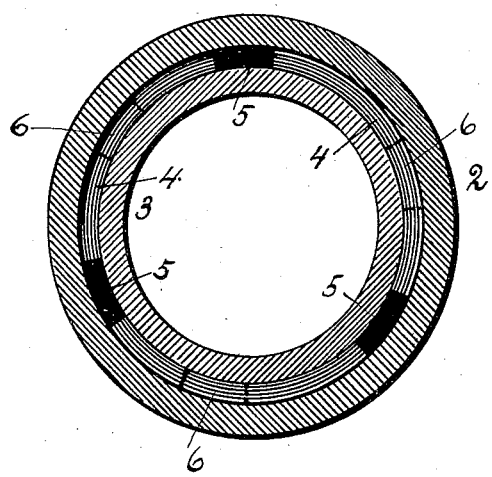

Figure 1 is a perspective view of the adjacent ends of two sections constructed in accordance with my improvement; and Fig. 2 is a cross-section of the joint, showing the manner in which the parts are retained and locked in position by means of packing.

Like figures designate corresponding parts in all of the figures.

In the drawings, 1 represents the section provided with an enlarged mouth or bell 2, into which the end of the other section 3 is inserted. The interior of the bell is of somewhat larger diameter than the general outside diameter of the pipe, and about half-way from the inner to the outer end is provided a flange 4, extending around the interior and having its inner circumference of the same diameter or slightly greater diameter than that of the end of the adjacent section. The flange 4 is cut away in several places, (three or more,) as shown at 5 5, at irregular distances apart. The end of the adjacent section 3 is provided with lugs 6 6, corresponding in form and position with the said notches in the flange, for the purpose of passing through said notches or openings and engaging behind the flange by the turning of the inserted section in either direction. The openings and lugs being at irregular distances apart, the sections cannot be separated by accidental displacement, there being always two of the lugs bearing against the shoulder formed by the inner edge of the flange. The sections cannot be separated, except by bringing the inserted section back to its first position, either by reversing the movement or making a complete turn. It is preferable that the inner section should only be turned to a distance equal to about one-half the distance between any two openings, as shown in Fig. 2, by which arrangement all three of the lugs bear against the inner edge of the flange at substantially its middle point.

To couple the sections the section 3 is held at such a position that the lugs 6 6 correspond with the openings 5 5, and then inserted in the bell, the lugs passing through said openings. The section 3 is then turned in either direction, when the lugs engage behind the flange, as shown in dotted lines in Fig. 5, a suitable mark being formed on the two sections to indicate the proper position, as shown at 7 7, Fig. 1. It will be observed that the section 3 is not only locked within the bell 2 and longitudinal displacement obviated, but the two sections are concentric, the face of the lugs 6 6 bearing against the interior surface of the bell, and the surface of the section 3 bearing against the face of the flange 4. By this arrangement any required length of pipe may be laid before any of the joints are packed and all danger of displacement is obviated. The necessity of adjusting the parts of each joint and tamping the same in position before packing is also obviated.

The joint is packed or calked substantially in the usual manner, the entrance to the mouth of the bell around the inserted section being closed, except a small space at the top, in any convenient manner, and melted lead or similar substance being poured therein. The calking material flows through the openings 5 5 and around the lugs 6 6, filling the entire open space. The bodies of calking material on each side of the flange are united by the material filling the openings, and the two sections are not only locked in place and prevented from turning one within the other, but the peculiar form assumed by the calking material prevents it from becoming displaced.

I claim as my invention—

In a joint for pipes, a pipe-section having a bell at one extremity and an annular flange formed within said bell intermediate between the mouth of the bell and its bottom, whereby annular spaces are formed behind and in front of said flange, said flange having irregularly-spaced openings therethrough, in combination with an adjacent entering pipe-section having irregularly-spaced exterior lugs corresponding in peripheral position with said openings, respectively, and adapted to enter through said openings the annular space behind said flange, engage with the shoulder formed by said flange, and turn axially in said annular space to any extent, substantially as set forth, whereby when said pipe-sections are in a locked position communicating calking-spaces are formed around said entering pipe-section on both sides of said annular flange.

In testimony whereof I affix my signature in presence of two witnesses.

JOSEPH PATRICK COSTIGAN.

Witnesses:
WALTER HOLCOMB,
F. W. LANE.